(12) United States Patent
Estus et al.

(10) Patent No.: US 12,495,171 B2
(45) Date of Patent: *Dec. 9, 2025

(54) SYSTEMS AND METHODS FOR TARGETED ADVERTISEMENT INSERTION INTO A PROGRAM CONTENT STREAM

(71) Applicant: DISH Network L.L.C., Englewood, CO (US)

(72) Inventors: Robert W. Estus, Centennial, CO (US); Robert F. Percival, Carr, CO (US)

(73) Assignee: DISH Network L.L.C., Englewood, CO (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/415,142

(22) Filed: Jan. 17, 2024

(65) Prior Publication Data

US 2024/0155164 A1    May 9, 2024

Related U.S. Application Data

(63) Continuation of application No. 18/097,116, filed on Jan. 13, 2023, now Pat. No. 11,910,036, which is a
(Continued)

(51) Int. Cl.
*H04N 21/234* (2011.01)
*H04N 21/439* (2011.01)
(Continued)

(52) U.S. Cl.
CPC ... *H04N 21/23424* (2013.01); *H04N 21/4394* (2013.01); *H04N 21/44008* (2013.01); *H04N 21/812* (2013.01)

(58) Field of Classification Search
None
See application file for complete search history.

(56) References Cited

U.S. PATENT DOCUMENTS 7,546,619 B2    6/2009    Anderson et al.
7,698,236 B2    4/2010    Cox et al.
(Continued)

FOREIGN PATENT DOCUMENTS

EP    2819425 A1    12/2014

OTHER PUBLICATIONS

DVB Organization, ANSI SCTE 30 2009, "Digital Program Insertion Splicing Application Program Interface", c/o EBU—17 A Ancienne Route—CH-1218 Grand Saconnex, Geneva, Switzerland, Jun. 15, 2009; 58 pgs.
(Continued)

*Primary Examiner* — William J Kim
(74) *Attorney, Agent, or Firm* — Jeremiah J. Baunach; Frontier IP Law PLLC

(57) ABSTRACT

A computerized system for targeted ad insertion receives a program content stream and detects images in the content stream. The system recognizes at least one visual object within the images and matches the recognized visual object to an advertisement that correlates with the recognized visual object. The system may then select an advertisement that advertises, correlates to, is directed to or is otherwise relevant to products or services falling under the theme, topic, category of interest and/or relevant viewer demographic and inserts an identifier of the matched advertisement at an insertion point into the program content stream. This enables playback of the matched advertisement during playback of the program content stream at a time that correlates to the insertion point into the program content stream of the identifier of the matched advertisement.

14 Claims, 8 Drawing Sheets

Related U.S. Application Data continuation of application No. 17/364,009, filed on Jun. 30, 2021, now Pat. No. 11,589,086, which is a continuation of application No. 16/547,371, filed on Aug. 21, 2019, now Pat. No. 11,082,724.

(51) Int. Cl.
  *H04N 21/44* (2011.01)
  *H04N 21/81* (2011.01)

(56) References Cited

U.S. PATENT DOCUMENTS

| | | |
|---|---|---|
| 7,730,509 B2 | 6/2010 | Anderson et al. |
| 7,849,477 B2 | 12/2010 | Cristofalo et al. |
| 8,065,703 B2 | 11/2011 | Anderson et al. |
| 8,108,895 B2 | 1/2012 | Anderson et al. |
| 8,146,126 B2 | 3/2012 | Downey et al. |
| 8,272,009 B2 | 9/2012 | Downey et al. |
| 8,763,029 B1 | 6/2014 | Haberman et al. |
| 8,776,115 B2 | 7/2014 | Sheehan et al. |
| 8,850,473 B2 | 9/2014 | Sheehan et al. |
| 9,124,915 B2 | 9/2015 | Sheenan et al. |
| 9,396,475 B2 | 7/2016 | Cristofalo et al. |
| 9,503,795 B2 | 11/2016 | Sheehan et al. |
| 9,530,148 B2 | 12/2016 | Kosinski et al. |
| 9,628,869 B1 | 4/2017 | Anderson |
| 9,693,086 B2 | 6/2017 | Kouritzin et al. |
| 9,712,788 B2 | 7/2017 | Downey et al. |
| 9,729,916 B2 | 8/2017 | Sheehan et al. |
| 10,327,026 B1 | 6/2019 | Mishra |
| 2002/0067730 A1 | 6/2002 | Hinderks et al. |
| 2003/0028873 A1 | 2/2003 | Lemmons |
| 2005/0215238 A1 | 9/2005 | Macaluso |
| 2007/0124781 A1 | 5/2007 | Casey et al. |
| 2007/0250901 A1 | 10/2007 | McIntire et al. |
| 2008/0098423 A1 | 4/2008 | Malik |
| 2008/0262912 A1 | 10/2008 | Gargi |
| 2008/0276271 A1 | 11/2008 | Anderson et al. |
| 2009/0067806 A1 | 3/2009 | Sengamedu |
| 2009/0210290 A1 | 8/2009 | Elliot et al. |
| 2009/0210899 A1 | 8/2009 | Lawrence-Apfelbaum et al. |
| 2009/0288109 A1 | 11/2009 | Downey et al. |
| 2010/0037253 A1 | 2/2010 | Sheehan et al. |
| 2010/0138290 A1 | 6/2010 | Zschocke et al. |
| 2010/0205049 A1 | 8/2010 | Long et al. |
| 2010/0269132 A1 | 10/2010 | Foti |
| 2011/0041151 A1 | 2/2011 | Cristofalo et al. |
| 2011/0067046 A1 | 3/2011 | Cox et al. |
| 2011/0072456 A1 | 3/2011 | White et al. |
| 2011/0078002 A1 | 3/2011 | Leary et al. |
| 2011/0078723 A1 | 3/2011 | Stettner et al. |
| 2011/0088059 A1 | 4/2011 | Wilson et al. |
| 2011/0142417 A1 | 6/2011 | Wilson et al. |
| 2011/0194838 A1 | 8/2011 | Meijer |
| 2011/0276400 A1 | 11/2011 | Kurnit et al. |
| 2012/0023131 A1 | 1/2012 | Downey et al. |
| 2012/0023522 A1 | 1/2012 | Anderson et al. |
| 2012/0204204 A1 | 8/2012 | Kouritzin et al. |
| 2012/0272265 A1 | 10/2012 | Kosinski et al. |
| 2013/0042285 A1 | 2/2013 | Downey et al. |
| 2013/0091521 A1 | 4/2013 | Phillips et al. |
| 2013/0097634 A1 | 4/2013 | Jin et al. |
| 2013/0137015 A1 | 5/2013 | Higaki |
| 2013/0219424 A1 | 8/2013 | Lechner et al. |
| 2013/0235347 A1 | 9/2013 | Hennessey et al. |
| 2013/0254787 A1 | 9/2013 | Cox et al. |
| 2014/0040026 A1* | 2/2014 | Swaminathan ........ G06Q 30/00 705/14.66 |
| 2014/0150019 A1 | 5/2014 | Ma et al. |
| 2014/0325540 A1 | 10/2014 | Garza et al. |
| 2014/0328570 A1 | 11/2014 | Cheng et al. |
| 2015/0037009 A1 | 2/2015 | Wang |
| 2015/0067720 A1 | 3/2015 | Sheenan et al. |
| 2015/0347415 A1 | 12/2015 | Pantos et al. |
| 2016/0150278 A1 | 5/2016 | Greene |
| 2016/0150290 A1 | 5/2016 | Chandler et al. |
| 2016/0212501 A1 | 7/2016 | Master et al. |
| 2018/0020247 A1 | 1/2018 | Zhang et al. |
| 2018/0249205 A1 | 8/2018 | Li et al. |
| 2019/0081995 A1 | 3/2019 | Ohare et al. |
| 2019/0213627 A1 | 7/2019 | Rudnick et al. |
| 2023/0247236 A1 | 8/2023 | Estus et al. |

OTHER PUBLICATIONS

DVB Organization, ANSI/SCTE 138 2013, "Stream Conditioning for Switching of Addressable Content in Digital Television Receivers", c/o EBU—17 A Ancienne Route—CH-1218 Grand Saconnex, Geneva, Switzerland, Aug. 14, 2013; 32 pgs.

DVB Organization, "DASH-Ad Insertion in DASH Architectures and Guidelines," Digital Video Broadcasting, c/o EBU—17A Ancienne Route—CH-1218 Grand Saconnex, Geneva, Switzerland, DASH Industry Forum, Mar. 23, 2014; 30 pgs.

INVIDI Technologies Addressable & Targeted TV Advertising, <https://www.invidi.com/addressable-advertising/how-it-works/>, Accessed on Aug. 7, 2019.

Ding, Jianbing, et al., "Real-Time Logo Recognition from Live Video Streams Using an Elastic Cloud Platform", WAIM 2016: Web-Age Information Management, Springer Intl. Publish Switzerland, 2016, pp. 469-480.

DVB Organization, "ANSI/SCTE 138 2013," Digital Video Broadcasting, c/o EBU—17A Ancienne Route—CH-1218 Grand Saconnex, Geneva, Switzerland, Aug. 14, 2013; 32 pgs.

* cited by examiner

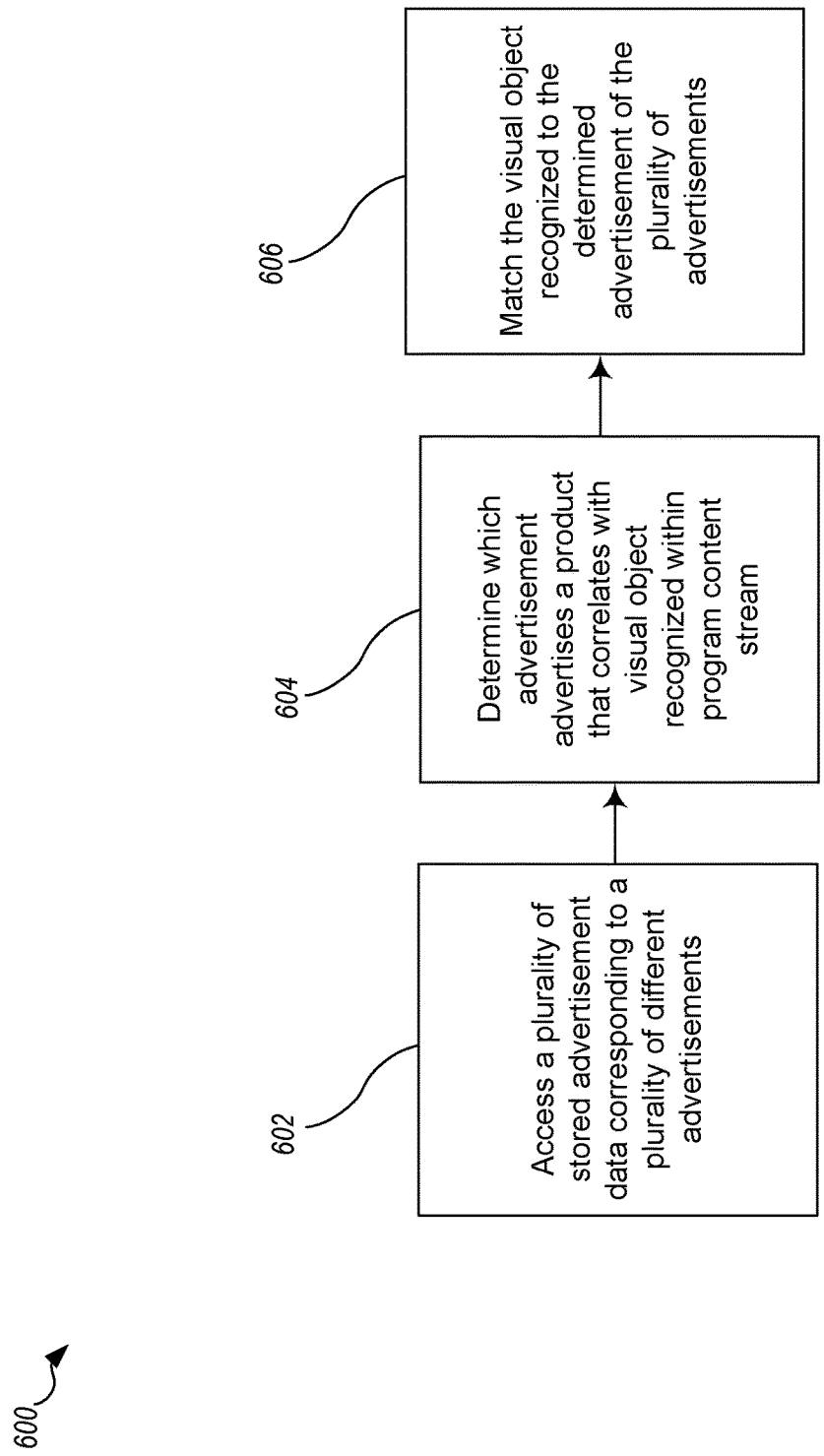

SYSTEMS AND METHODS FOR TARGETED ADVERTISEMENT INSERTION INTO A PROGRAM CONTENT STREAM

TECHNICAL FIELD

This disclosure generally relates to the technology of providing targeted advertisements, and more particularly, to automated targeted advertisement insertion into a program content stream.

BRIEF SUMMARY

Program distributors deliver audio and/or video program content to its subscribers. The program content includes, for example, television programs, multimedia services, and the like, and may further include advertisement content. The program distributors typically deliver the audio/video content to its subscribers in an industry-standard format, for example, the Moving Picture Experts Group (MPEG) MPEG-4 transport stream format.

The Society of Cable Telecommunications Engineers (SCTE) develops technology standards related to cable telecommunications engineering. The SCTE 35 standard defines the splicing of an MPEG-4 transport stream for the purpose of digital program insertion. The SCTE 35 standard also defines the messages and structure that allow the program distributor to splice, or insert, advertisements and other digital program content into the audio/video content.

Subscribers often have a receiving device, such as a set-top box, which may include a digital video recorder (DVR) or other similar content recording functionality. Advertisements may have different applicability or relevance to the viewer based on the content of the program content. However, selection of particularly relevant advertisements based on the program content is often not accurate and not particularly specific to actual objects, activities or scenes in the program. Also, automatically tying product placements in program content to particular advertisements to be played during breaks in the program content in an efficient and accurate manner provides an efficient way to provide targeted advertising. Thus, the embodiments disclosed herein improve the technology of targeted advertising by increasing the speed, accuracy and flexibility of selection and playing of targeted advertisements.

A computer implemented method for targeted ad insertion into a program content stream may be summarized as including receiving, by a computerized system for targeted ad insertion, the program content stream; detecting, by the computerized system for targeted ad insertion, images in the content stream; recognizing, by the computerized system for targeted ad insertion, at least one visual object within the images; matching, by the computerized system for targeted ad insertion, the recognized at least one visual object within the images to an advertisement that correlates with the recognized at least one visual object; and inserting, by the computerized system for targeted ad insertion, an identifier of the matched advertisement at an insertion point into the program content stream, enabling playback of the matched advertisement during playback of the program content stream at a time that correlates to the insertion point into the program content stream of the identifier of the matched advertisement.

The method may further include initiating, by the computerized system for targeted ad insertion, playback of the program content stream; recognizing, by the computerized system for targeted ad insertion, the identifier of the matched advertisement during playback of the program content stream; accessing, by the computerized system for targeted ad insertion, content of the matched advertisement in response to the recognizing the identifier of the matched advertisement during playback of the program content stream; and inserting, by the computerized system for targeted ad insertion, the content of the matched advertisement into the program content stream during the playback of the program content stream.

The method may further include playing, by the computerized system for targeted ad insertion, the content of the matched advertisement during the playback of the program content stream at a time during playback of the program content stream that correlates to the insertion point into the program content stream of the identifier of the matched advertisement. The initiating playback of the program content stream; recognizing the identifier of the matched advertisement during playback of the program content stream; the accessing content of the matched advertisement in response to the recognizing the identifier of the matched advertisement during playback of the program content stream; and the inserting the content of the matched advertisement into the program content stream during the playback of the program content stream may be performed by a receiving device at a customer premises. The playing the content of the matched advertisement during the playback of the program content stream at a time during playback of the program content stream that correlates to the insertion point into the program content stream of the identifier of the matched advertisement may be performed by a receiving device at a customer premises. The receiving the program content stream; the detecting images in the content stream; the recognizing at least one visual object within the images; the matching the recognized at least one visual object within the images to an advertisement that correlates with the recognized at least one visual object; and the inserting, the identifier of the matched advertisement at an insertion point into the program content stream, enabling playback of the matched advertisement during playback of the program content stream at a time that correlates to the insertion point into the program content stream of the identifier of the matched advertisement may be performed by a content server outside a customer premises. The matching the recognized at least one visual object within the images to an advertisement that correlates with the recognized at least one visual object may include determining the recognized at least one visual object in the images is a product advertised in the advertisement; and recognizing there exists a correlation between the recognized at least one visual object and the advertisement based on the determination. The matching the recognized at least one visual object within the images to an advertisement that correlates with the recognized at least one visual object may include determining the recognized at least one visual object in the images represents an action sequence that relates to a product or service advertised in the advertisement; and recognizing there exists a correlation between the at least one visual object and the advertisement based on the determination. The matching the recognized at least one visual object within the images to an advertisement that correlates with the recognized at least one visual object may include determining the recognized at least one visual object in the images is one or more words representing a product or service advertised in the advertisement; and recognizing there exists a correlation between the at least one visual object and the advertisement based on the determination. The recognizing the at least one visual object within the images may include detecting a plurality of visual object candidates within the images; determining at least one of the visual object candidates is a type of visual object associated with one or more of a plurality of advertisements; and recognizing the at least one of the visual object candidates as the at least one visual object within the images based on the determination. The matching the recognized at least one visual object within the images to an advertisement that correlates with the recognized at least one visual object may include accessing a plurality of stored advertisement data corresponding to a plurality of different advertisements; determining which advertisement of the plurality of advertisements advertises a product that correlates with the recognized at least one visual object within the images based on the accessing of the plurality of stored advertisement data; and matching the recognized at least one visual object within the images to the determined advertisement of the plurality of advertisements.

The method may further include detecting, by the computerized system for targeted ad insertion, audio in the content stream; recognizing, by the computerized system for targeted ad insertion, at least one characteristic of the audio; matching, by the computerized system for targeted ad insertion, the recognized at least one characteristic of the audio to an advertisement that correlates with the recognized at least one characteristic of the audio; and inserting, by the computerized system for targeted ad insertion, an identifier of the matched advertisement at an insertion point into the program content stream, enabling playback of the matched advertisement during playback of the program content stream at a time that correlates to the insertion point into the program content stream of the identifier of the matched advertisement.

A system may be summarized as including at least one computer processor; and at least one memory coupled to the at least one computer processor, the at least one memory having computer-executable instructions stored thereon that, when executed by the at least one computer processor, cause the at least one computer processor to initiate playback of a program content stream; recognize an identifier of an advertisement during playback of the program content stream, the identifier having been inserted at an insertion point into the program content stream in response to at least one visual object recognized within images of the content stream being matched to the advertisement which correlates with the recognized at least one visual object; access content of the advertisement in response to the recognizing of the identifier of the advertisement during playback of the program content stream; and insert the content of the advertisement into the program content stream during the playback of the program content stream.

The computer-executable instructions, when executed by the at least one computer processor, may further cause the at least one computer processor to play the content of the advertisement during the playback of the program content stream at a time during playback of the program content stream that correlates to the insertion point into the program content stream of the identifier of the advertisement. The accessing content of the advertisement in response to the recognizing the identifier of the advertisement during playback of the program content stream may include accessing content of the advertisement at a set-top box from a remote advertisement server. The accessing content of the advertisement in response to the recognizing the identifier of the advertisement during playback of the program content stream may include accessing content of the advertisement by a set-top box from local storage of the set-top box. The computer-executable instructions, when executed by the at least one computer processor, may further cause the at least one computer processor to receive a plurality of stored advertisement data corresponding to a plurality of different advertisements; search the plurality of stored advertisement data corresponding to a plurality of different advertisements for advertisement data that is identified by the identifier of the advertisement during playback of the program content stream; and access content of the advertisement in response to the recognizing the identifier of the advertisement during playback of the program content stream based on the advertisement data that is identified by the identifier of the advertisement during playback of the program content stream.

A non-transitory computer-readable storage medium having computer-executable instructions stored thereon that, when executed by at least one processor, may cause the at least one processor to access a plurality of stored advertisement data corresponding to a plurality of different advertisements; determine which advertisement of the plurality of advertisements advertises a product that correlates with at least one visual object recognized within images of a program content stream based on the accessing of the plurality of stored advertisement data; and match the at least one visual object recognized within the images to the determined advertisement of the plurality of advertisements.

The computer-executable instructions, when executed by the at least one processor, may further cause the at least one processor to insert an identifier of the determined advertisement of the plurality of advertisements at an insertion point into the program content stream, enabling playback of the determined advertisement of the plurality of advertisements during playback of the program content stream at a time that correlates to the insertion point into the program content stream of the identifier of the determined advertisement of the plurality of advertisements. The computer-executable instructions, when executed by at least one processor, may further cause the at least one processor to access content of the determined advertisement of the plurality of advertisements in response to recognizing the identifier of the determined advertisement of the plurality of advertisements during playback of the program content stream.

BRIEF DESCRIPTION OF THE SEVERAL VIEWS OF THE DRAWINGS

FIG. 6 is a flowchart illustrating a method for matching a visual object recognized within the program content stream to an advertisement according to one embodiment.

Figure 1A:
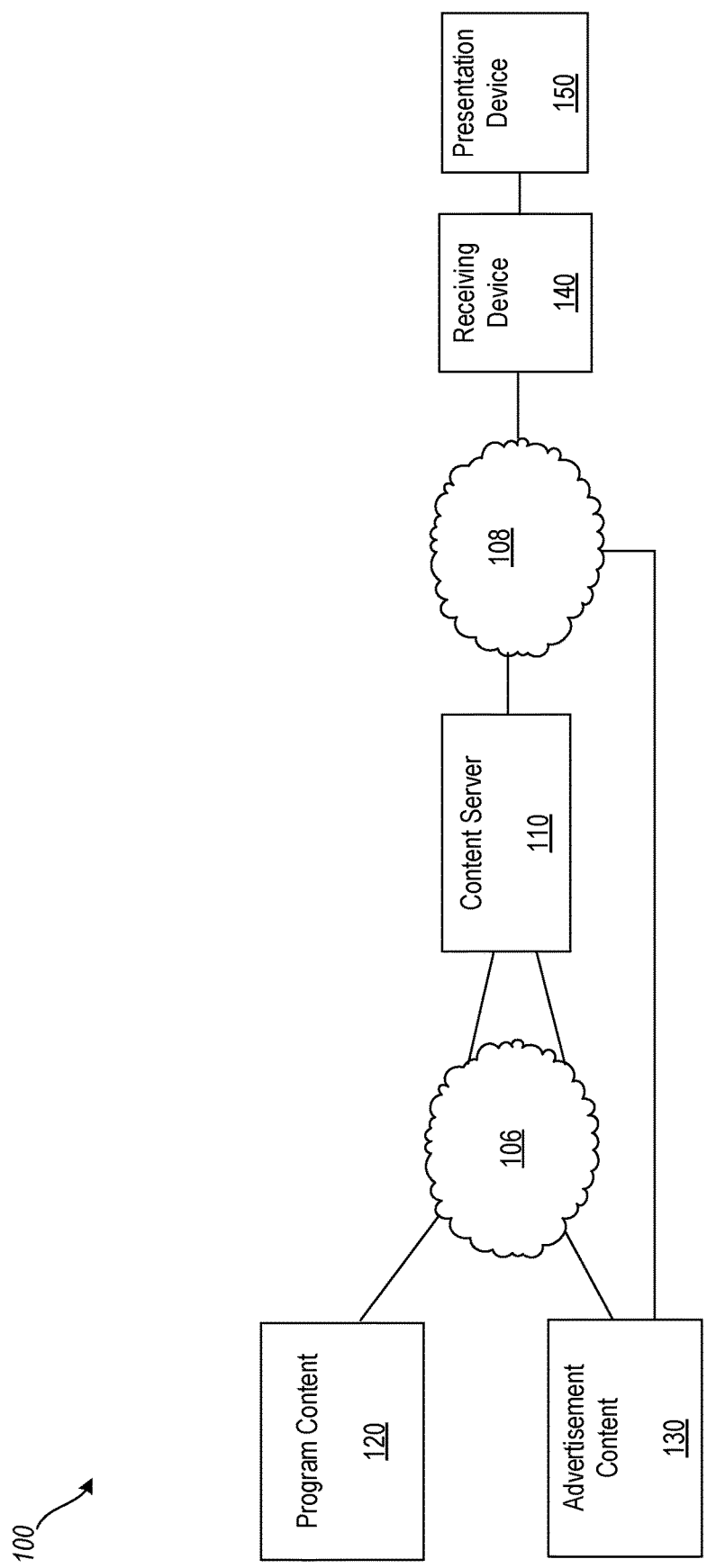
FIG. 1A is a block diagram illustrating an overview of a system for targeted advertisement insertion into a program content stream, according to one embodiment.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

The embodiments disclosed herein improve the technology of targeted advertising by increasing the speed, accuracy and flexibility of selection and playing of targeted television advertisements. In one embodiment, a computerized system for targeted ad insertion, receives a program content stream and detects images in the content stream. The system recognizes at least one visual object within the images and matches the recognized visual object to an advertisement that correlates with the recognized visual object. Part or all of this process of object recognition and matching may be performed automatically by the system or manually. For example, if the system recognizes a particular model of car throughout a number of scenes in the television program, the system may search a database of advertisements and match the car to a particular advertisement that advertises that car. The system may also or instead determine a theme, topic, category of interest and/or relevant viewer demographic determined likely to be interested in such a program based on the recognition and analysis of relevant objects and/or action sequences appearing in the images of the program content. The system may then select an advertisement that advertises, correlates to, is directed to or is otherwise relevant to products or services falling under the theme, topic, category of interest and/or relevant viewer demographic. The system then inserts an identifier of the matched advertisement at an insertion point into the program content stream. This enables playback of the matched advertisement during playback of the program content stream at a time that correlates to the insertion point into the program content stream of the identifier of the matched advertisement. For example, such advertisements may be automatically inserted during playback of the program content by the viewer's device, such as a set-top box, accessing the advertisement content, either remotely or locally, using the identifier of the matched advertisement. Since the advertisement matches with a particular object in the program content, it is relevant to the program content and likely more relevant and more accurately targeted to the viewer watching that program. For example, this may be due to the viewer deciding to watch that program with such objects appearing in it generally indicating a greater interest of that viewer in those objects than viewers that did not decide to watch that program.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1A is a block diagram illustrating an overview of a system 100 for targeted advertisement insertion into a program content stream, according to one embodiment.

It is to be appreciated that FIG. 1 illustrates one example of a system for targeted advertisement insertion into the program content stream and that the various embodiments discussed herein are not limited to the exemplary network of FIG. 1. The system 100 may include a variety of communication systems and may use a variety of communication media including, but not limited to, satellite wireless media, cable media or any media over which communication of broadcast television programming, on-demand programming, and/or streaming media may occur, and/or over which Internet communication may occur.

The system 100 includes a content server 110, which receives program content 120 and which may access or receive advertisement content 130. Program content 120 may be provided from one or more content providers (not shown), which provide content such as video content and/or audio content (hereinafter "program content") to a distributor, such as a distributor operating the content server 110. The program content 120 may include content provided from content providers such as television stations which provide local or national video programming, special content providers which provide premium based programming or pay-per-view programming, and/or radio stations which provide audio programming. In addition, or in the alternative, the program content 120 may include content provided from on-demand content services, streaming media services, or the like which provide audio, video and other types of program content to the content server 110 for delivery of programming to a subscriber.

Advertisement content 130 may be provided to, or accessible by, the content server 110 from one or more advertisement sources, which may be or include one or more databases storing advertisement content 130. Advertisement content 130 may be provided to the content server 110 directly from advertisers, or from third party advertisement aggregators, services or the like.

The content server 110 receives the program content 120 and accesses or receives advertisement content 130 over a communication network 106, and the content server 110 is coupled to a receiving device 140 over a communication network 108. The receiving device 140 (e.g., a set-top box, digital video recorder (DVR), media player, smartphone or mobile computing device) receives the program content 120 and receives or accesses the advertisement content 130 and connects to a presentation device (e.g., a television, monitor or other display device) 150 to display the program content 120 and advertisement content 130 received from the content server 110. In some embodiments, the receiving device 140 receives or accesses the advertisement content 130 directly from the another source outside of the content server 110 via communication network 108, such as directly from advertisers, or from third party advertisement aggregators, services or the like.

The communication networks 106, 108 may be or include many different types of communication media, now known or later developed. Non-limiting media examples include telephony systems, the Internet, internets, cable networks, fiber optic networks, microwave networks, asynchronous transfer mode (ATM) systems, frame relay networks, packet switched networks, digital subscriber loop (DSL) systems, radio frequency (RF) networks and satellite systems. Further, program content 120 and/or advertisement content 130 may be communicated from program and advertisement content providers to the content server 110 and/or receiving device 140 over various combinations of media. For example, a television broadcast station may initially communicate program content, via an RF signal or other suitable medium, which is received and then converted into a digital signal suitable for transmission to the content server 110 over a fiber optics network. As another non-limiting example, an audio content provider may communicate audio content via its own satellite system to the content server 110. The received program content 120 and/or advertisement content 130 is converted by one or more devices (not shown) as necessary at the content server 110 into a suitable signal that is communicated (i.e., "uplinked") by one or more antennae to one or more satellites (not separately illustrated herein, although considered part of the communication network 108). It is to be appreciated that the communicated uplink signal may contain a plurality of multiplexed programs. The uplink signal is received by the satellite and then communicated (i.e., "downlinked") from the satellite in one or more directions, for example, onto a predefined portion of the planet. It is appreciated that the format of the above-described signals are adapted as necessary during the various stages of communication.

An antenna that is within reception range of the downlink signal communicated from satellite receives the above-described downlink signal. The antenna can be located at a customer premises. Examples of customer premises include a residence, a business, a car, or any other suitable location operable to receive signals from satellite or other communication systems. The received signal is communicated, typically over a hard-wire connection, to the receiving device 140, which converts the received signal into a signal suitable for communication to a presentation device 150.

The receiving device 140 may receive content partially from, or entirely from, another source other than the above-described antenna. Other embodiments of the receiving device 140 may receive locally broadcast RF signals, and/or may be coupled to communication network 108 via any suitable medium. Non-limiting examples of media communicatively coupling the receiving device 140 to communication network 108 include cable, fiber optic, radio frequency, streaming or Internet media.

The receiving device 140, as well as any other devices shown in FIG. 1 and/or other devices or systems described herein, may include at least one computer processor coupled to at least one non-transitory memory, and is configured to execute computer-executable instructions to carry out, enable and/or otherwise perform applicable actions described herein of the system 100 and the different embodiments described herein. Examples of a receiving device include, but are not limited to: a television converter, receiver, set-top box, television receiving device, television receiver, television recording device, satellite set-top box, satellite receiver, cable set-top box, cable receiver, personal computer, media player, mobile device, tablet computing device, smart phone and/or television tuner. Accordingly, the receiving device 140 may be any suitable converter device or electronic equipment that is operable to receive programming (i.e., program content 120 and advertisement content 130). Further, the receiving device 140 may itself include user interface devices, such as buttons, switches, a display, and may include the presentation device 150. Additionally, the receiving device 140 may include recording capability, and may be or include a digital video recorder (DVR).

Examples of a presentation device 150 include, but are not limited to: a television (TV), a personal computer (PC), a media player, mobile device, tablet computing device, smart phone or the like. Presentation devices 150 employ a display, one or more speakers and/or other output devices to communicate program content 120 and/or advertisement content 130 to a user. In many implementations, one or more presentation devices 150 reside in or near a customer's premises and are communicatively coupled, directly or indirectly, to the receiving device 140.

Figure 1B:
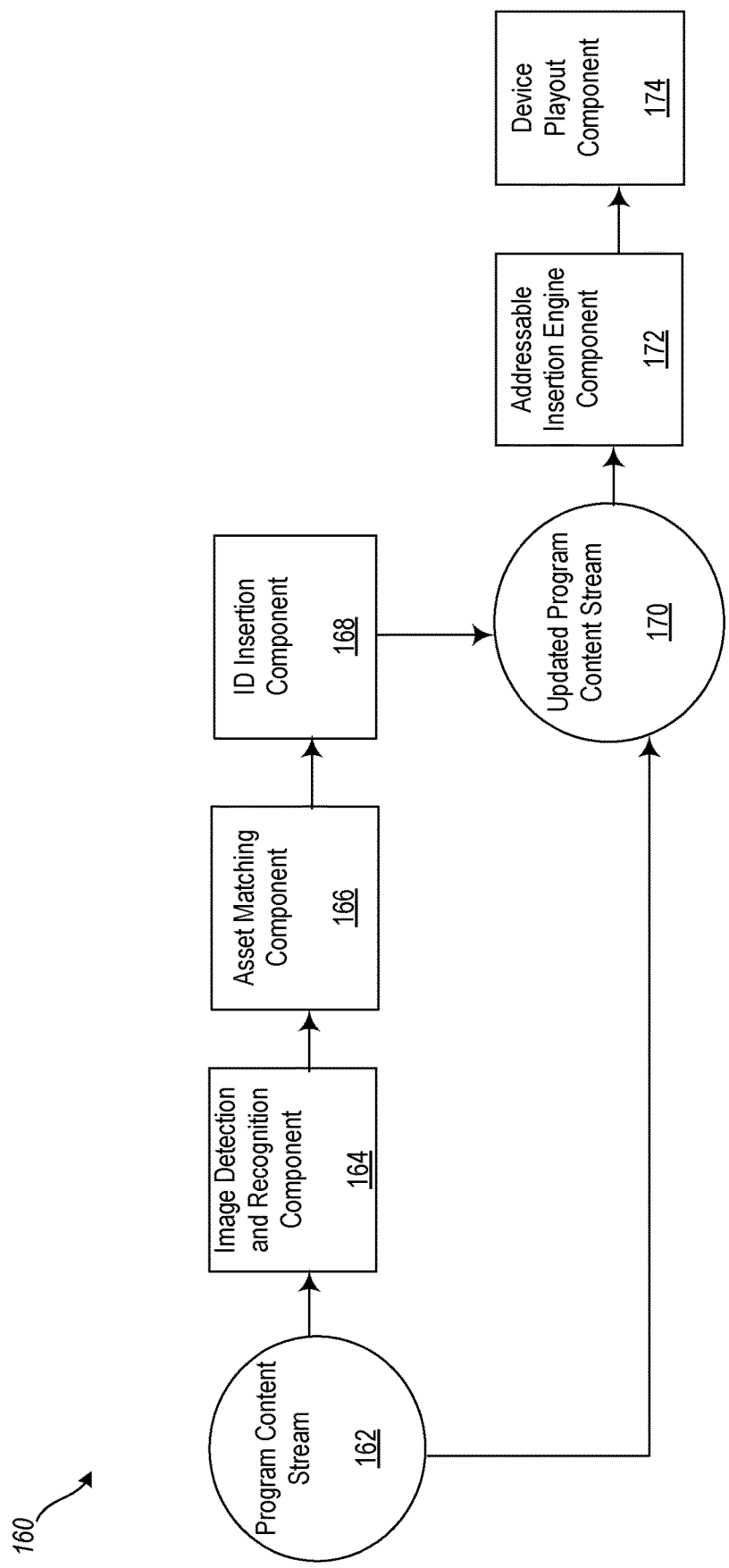
FIG. 1B is a block diagram illustrating various example components of a system for targeted advertisement insertion into a program content stream, according to one embodiment.

FIG. 1B is a block diagram illustrating various example components 160 of a system for targeted advertisement insertion into a program content stream, according to one embodiment.

The components 160 may comprise of and/or implemented in corresponding software, hardware or a combination thereof, and be part of or in communication with the content server 110, receiving device 140 and/or presentation device 150 of FIG. 1. In one embodiment, during a live broadcast of the program content stream 162, an image detection and recognition component 164 of the content server 110 may receive the program content stream 162 and detect images in the program content stream 162. For example, the image detection and recognition component 164 may, in order to process the program content stream 162, extract and possibly make copies of digital video frames or sequences of digital video frames from the program content stream 162 as it is being broadcast or otherwise sent. Such video frames may comprise the images or be converted into digital images of one or more various digital image formats (e.g., JPEG, Exif, TIFF, GIF, BMP, raster formats, 2D or 3D vector formats, compound formats, stereo formats, etc.) for processing by the image detection and recognition component 164 for object recognition. The image detection and recognition component 164 may then recognize one or more visual objects within the images by processing the images (e.g., using real-time and video processing object detection utilizing computer vision) in a manner to detect particular products, objects, activities, characteristics, language and/or words within the frames, scenes or audio of the program content steam. For example, such objects may include objects that are, or are related to, products or services advertised by particular television commercials or other advertisements. In some embodiments, a plurality of objects may be recognized as representing a particularly relevant action sequence or scene. For example, objects may include or represent, but are not limited to: products such as cars, electronics, food, sporting goods, household goods, household supplies, gift items, clothes, accessories, etc.; places, such as restaurants, hotels, resorts, vacation destinations, homes for sale, etc.; people, such as actors, celebrities, politicians, groups, etc.; or services, such as providing insurance, providing cellular, cable, satellite or Internet services, providing information technology (IT) services, providing tax services, etc.

Such video processing object detection performed by the image detection and recognition component 164 may include the image detection as part of the video processing object detection process. The image detection and recognition component 164 may also be configured to determine the location of the object in the video frame or image. In some embodiments, image detection and recognition component 164 comprises (and/or executes) object recognition logic that identifies and determines the object in the image and/or the location of the object in the image. The object recognition logic may be software that employs any suitable methodology that identifies the object in the image and, in some embodiments, determines the location of the object in the image. As a non-limiting example, the image detection and recognition component 164 may employ edge matching techniques, divide-and-conquer search techniques, color and/or grayscale matching techniques, gradient matching techniques, eigenvector analysis techniques, geometric hashing techniques, scale-invariant feature transform (SIFT) techniques, speeded up robust features (SURF) techniques, and/or template matching techniques.

In some embodiments, the image detection and recognition component 164 may use one or more reference objects to compare with objects detected in one or more images from the program content stream 162 to determine what the detected object is and/or whether the object detected is relevant to a particular advertisement. For example, the image detection and recognition component 164 may use a reference image of a bag of a particular brand of potato chips and compare objects detected in the program content stream 162 to this reference image to determine whether one or more of the objects detected in the program content stream 162 is or represents the particular brand of potato chips.

The image detection and recognition component 164 may also detect a plurality of visual object candidates within the images. The image detection and recognition component 164 may then determine at least one of the visual object candidates is a type of visual object associated with one or more of a plurality of advertisements. A classification of the detected object may then be moved from a visual object candidate to a recognized visual object based on the determination that it is a type of visual object associated with one or more of a plurality of advertisements. For example, background objects in the program content stream 162 such as sky and trees may be detected as visual object candidates, but then disregarded by the image detection and recognition component 164 as not being recognized as a type of visual object associated with one or more of a plurality of advertisements.

The asset matching component 166 of the content server 110 may then match one or more of the recognized visual objects within the images to a particular advertisement that correlates with the recognized visual object. In one embodiment, the asset matching component 166 accesses a plurality of stored advertisement data corresponding to a plurality of different advertisements. The asset matching component 166 then determines which advertisement of the plurality of advertisements advertises a product that correlates with the recognized visual object(s) within the images based on the accessing of the plurality of stored advertisement data. The asset matching component 166 will then match the recognized object(s) within the images to the determined advertisement of the plurality of advertisements. For example, the asset matching component 166 may search a database of advertisements (e.g., stored at the content server 110, receiving device 140 and/or an advertisement server) and match the object recognized as the bag of a particular brand of potato chips to a particular advertisement that advertises that brand of potato chips. In some embodiments, the advertisement that advertises that brand of potato chips may be associated with or linked to a reference image of the bag of potato chips and/or a reference image of a trademark, logo, name and/or other characteristic used by the image detection and recognition component 164 and recognizable as or within an object detected in the program content stream 162 by the image detection and recognition component 164.

In some embodiments, the asset matching component 166 determines the recognized visual object(s) in the images is or represents one or more of the following: a product advertised in the advertisement; an action sequence that relates to a product or service advertised in the advertisement; or one or more words representing a product or service advertised in the advertisement. The asset matching component 166 then recognizing there exists a correlation between the at least one visual object and the advertisement based on the determination.

The asset matching component 166 may also or instead determine a theme, topic, category of interest and/or relevant viewer demographic determined likely to be interested in such a program based on the recognition and analysis by the image detection and recognition component 164 of relevant objects, words and/or action sequences appearing in the images of the program content stream 162. The asset matching component 166 may then select an advertisement that advertises, correlates to, is directed to or is otherwise relevant to products or services falling under the theme, topic, category of interest and/or relevant viewer demographic. Such advertisements may be selected utilizing or otherwise based on tags or other metadata associated with such advertisements that indicate which of such advertisements fall under the theme, topic, category of interest and/or relevant viewer demographic associated with the detected objects in the program content stream 162.

Part or all of the process of object recognition and matching may be performed manually or automatically by the system. For example, in some embodiments, the process of object recognition and matching may be performed manually for VOD applications where the program content is stored for playout at a later time.

In response to the asset matching component 166 matching the recognized visual object(s) within the images to an advertisement that correlates with the recognized visual object(s), the identification (ID) insertion component 168 then inserts an identifier of the matched advertisement at an insertion point into the program content stream. As explained in more detail below with respect to FIGS. 2A and 2B, this enables playback of the matched advertisement during playback of the program content stream at a time that correlates to the insertion point into the program content stream of the identifier of the matched advertisement. For example, the identifier may be a code, number link or other metadata identifying an advertisement that enables the advertisement to be found in a database of advertisements by searching the database using the identifier or otherwise using the identifier. Insertion of the ID results in an updated program content stream 170 that may be communicated to the receiving device 140 from the content server 110 with one more identifiers of advertisements inserted therein.

After initiation of playback of the updated program content stream 170 by the receiving device 140, the addressable insertion engine component 172 of the receiving device 140 may then recognize the identifier of the matched advertisement during playback of the updated program content stream 120b. In response to recognizing the identifier in the updated program content stream 120b, the addressable insertion engine component 172 may then access content of the matched advertisement. For example, such content may be accessed from a one or more databases storing advertisement content 130. Advertisement content 130 may be provided to the receiving device 140 from the content server 110, directly from advertisers, or from third party advertisement aggregators, services or the like. In some embodiments, such advertisement content may be pre-loaded and stored on the receiving device 140 for quicker access in real-time or near real-time as the updated program content stream 170 is being played by the receiving device 140 and/or accessed remotely as the updated program content stream 170 is being played by the receiving device 140. The addressable insertion engine component 172 then inserts the content of the matched advertisement into the program content stream during playback of the updated program content stream 170 by the receiving device 140.

In one embodiment, the system 100 may also or instead detect audio in the program content stream 162 and recognize at least one characteristic of the audio. The system 100 then matches the recognized characteristic of the audio to an advertisement that correlates with the recognized characteristic of the audio and inserts an identifier of the matched advertisement at an insertion point into the program content stream 162 to generate the updated program content stream 170 to enable playback of the matched advertisement during playback of the updated program content stream 170 at a time that correlates to the insertion point into the updated program content stream 170 of the identifier of the matched advertisement. In some embodiments, the system 100 may select the matching advertisement based on a combination of detected audio characteristic with detected visual objects. For example, a character in a television program may say the name of a product advertised by the advertisement and the product is concurrently or later detected to be shown in the program, thus triggering insertion of the advertisement that advertises the product.

In some embodiments, the receiving device 140 may include recording capability, and may be or include a digital video recorder (DVR). As such, a user may record a broadcast program stream and store the program for later playout on the presentation device 150. The updated program content stream 170 received by the receiving device 140 during original broadcasting of the content, may be stored by the receiving device 140 for later playout. An advertisement may be inserted into the updated program content stream 170 by the addressable insertion engine component 172 upon detection of the identifier of the advertisement by the receiving device 140 during broadcast of the updated program content stream 170 or alternatively during playback of the recorded updated program content stream 170.

As explained in more detail below with respect to FIG. 3 below, the addressable insertion engine component 172 inserts the content of the matched advertisement into the updated program content stream 170 such that the matched advertisement is played by the device playout component 174 of the receiving device 140 during the corresponding commercial break in the program during playback of the updated program content stream 170 by the receiving device 140. In particular, the device playout component 174 plays content of the matched advertisement during the playback of the updated program content stream 170 at a time during playback of the updated program content stream 170 that correlates to the insertion point into the updated program content stream 170 of the identifier of the matched advertisement.

Figure 2A:
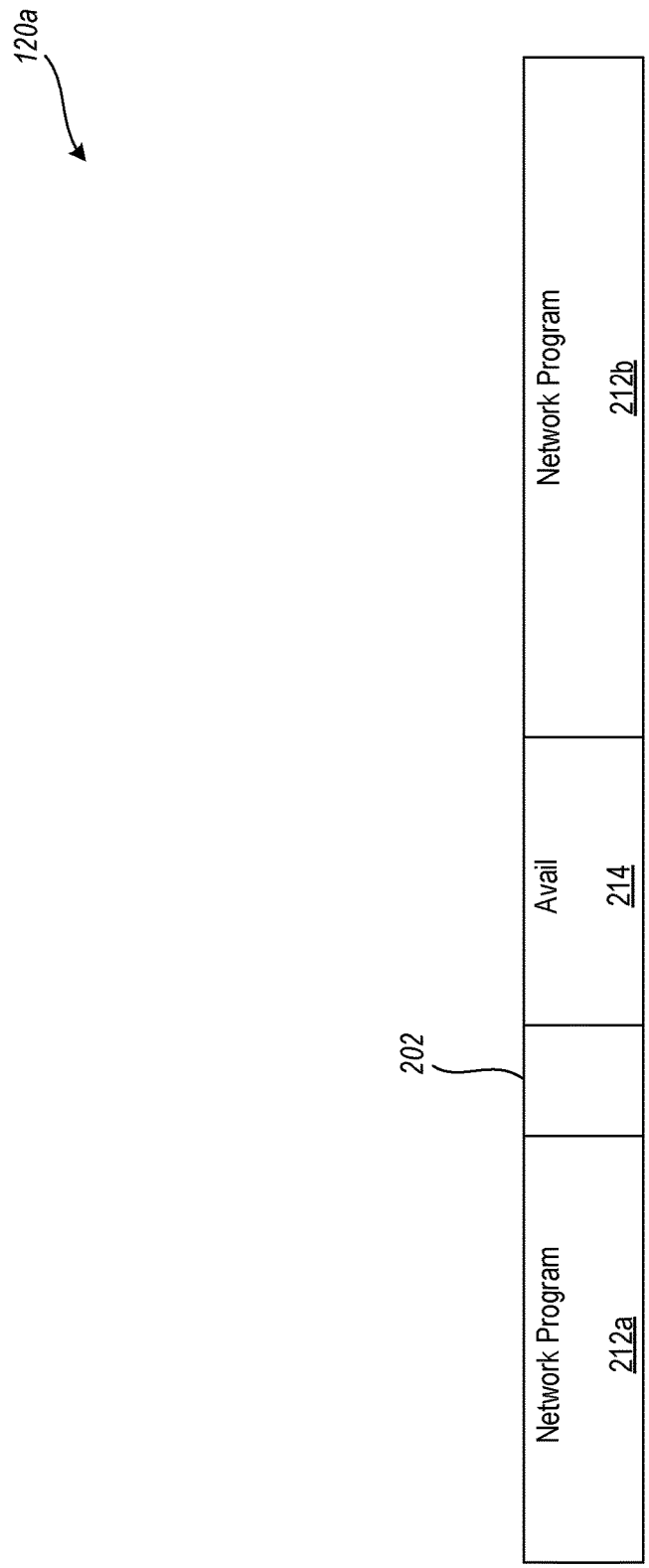
FIG. 2A is a signal diagram illustrating a program content stream including an advertisement insertion cue and an avail, according to one embodiment.
Figure 2B:
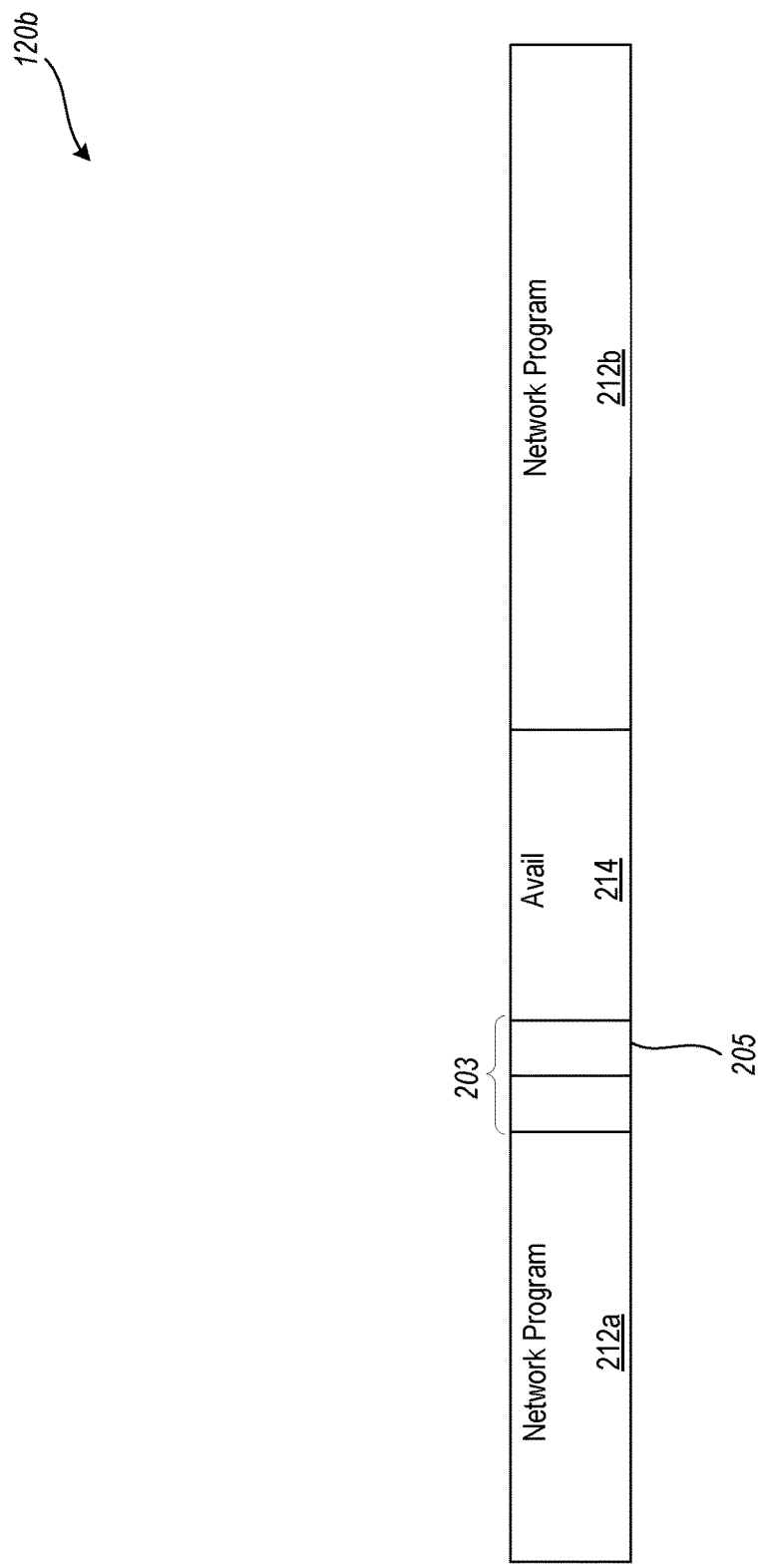
FIG. 2B is a signal diagram illustrating a program content stream including an advertisement insertion cue with an identifier of an advertisement inserted into the advertisement insertion cue, according to one embodiment.

FIG. 2A is a signal diagram illustrating a program content stream 120a including an advertisement insertion cue 202 and an avail 214 and FIG. 2B is a signal diagram illustrating an updated program content stream 120b including an advertisement insertion cue 203 with an identifier of an advertisement 205 inserted into the advertisement insertion cue 203, according to one embodiment.

The program content stream 120a received by the content server 110 may include advertisement insertion cues, such as advertisement insertion cue 202. For example, the program content stream 120a (which may be, for example, received external television signals) may be a MPEG-4 transport stream having embedded advertisement insertion cues in accordance with the SCTE 35 standard. SCTE 35 is a broadcast standard that pertains to digital program insertion (DPI) in broadcasts, and describes the in-stream insertion of cue tones in MPEG streams to signal splicing and insertion (e.g., advertisement insertion or insertion of other content types) opportunities. As shown in FIG. 2A, the program content 120 may include an advertisement insertion cue 202 (such as a modified SCTE 35 signal) that includes a presentation time stamp (PTS) field for addressable insertion, such that the advertisement insertion cue 202 indicates to the content server 110 and/or the receiving device 140 when to insert the addressable content (e.g., a local advertisement) into the programming stream for playout. The program content 120 may include a broadcasting stream having an avail portion 214, meaning an advertisement time slot, disposed between network program portions 212a, 212b. The advertisement insertion cue 202 indicates a timing, such as a specific frame or PTS in the received program content 120 stream, for inserting an advertisement into the avail portion 214 of the program content stream 120a. As shown in FIG. 2B, the advertisement insertion cue 203 may also include other metadata inserted by the ID insertion component 168 into the program content stream 120a to generate the updated program content stream 120b shown in FIG. 2B. Such other metadata may include an identifier of a particular advertisement 205 to be inserted by the addressable insertion engine component 172 into the avail portion 214 of the updated program content stream 120b according to the timing indicated by the advertisement insertion cue 203. The advertisement insertion cue 203 corresponds to the avail portion 214 of the program content stream 120b and thus enables playback of a particular advertisement matched to an object detected in the program content (identified by the identifier 205) during playback of the program content stream 120b at a time that correlates to the insertion point into the program content stream 120b indicated by the avail 214. Thus, during a live broadcast, the content server 110 receives the program content stream 120a, generates a modified advertisement insertion cue 203 including the identifier of an advertisement 205 and provides the updated program content stream 120b, including the modified advertisement insertion cue 203, to the receiving device 140.

Figure 3:
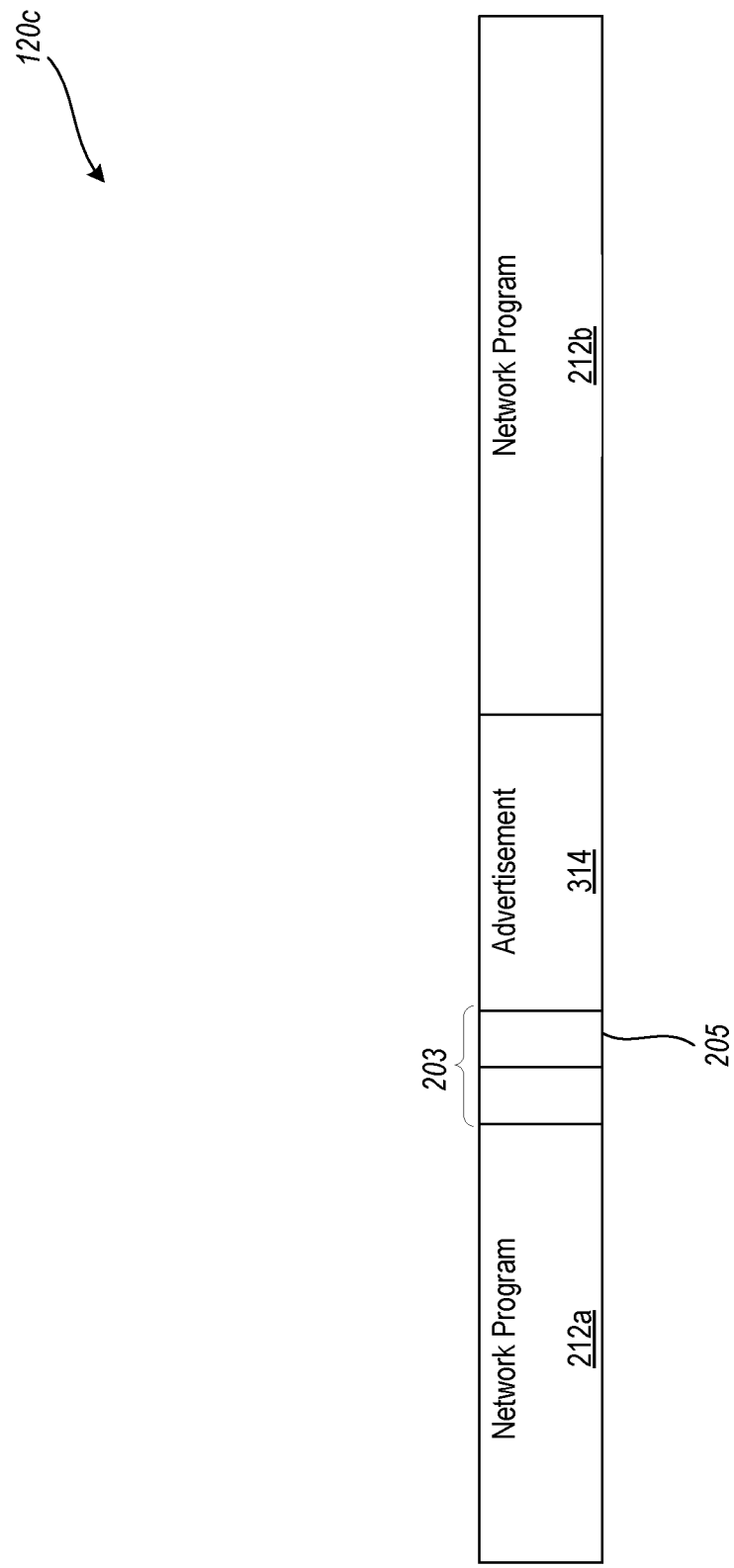
FIG. 3 is a signal diagram illustrating a program content stream including an advertisement inserted into the avail based on an identifier of an advertisement inserted into the advertisement insertion cue, according to one embodiment.

FIG. 3 is a signal diagram illustrating a program content stream 120b including an advertisement inserted into the avail 214 based on the identifier of an advertisement 205 inserted into the advertisement insertion cue 203, according to one embodiment.

Either of the content server 110 or the receiving device 140, upon recognition of the advertisement insertion cue 203, inserts a particular advertisement identified by the identifier of an advertisement 205, from the advertisement content 130, into the avail 214 slot of the updated program content stream 120b. The device playout component 174 of the receiving device 140 then plays content of the inserted advertisement 314 during the playback of the updated program content stream 120c at a time during playback of the updated program content stream 120c that correlates to the insertion point into the updated program content stream 120c of the identifier of the inserted advertisement. In various alternative embodiments, insertion of the advertisement 314 may be performed upon detection of the advertisement insertion cue 203 by the content server 110 or by the receiving device 140.

The device playout component 174 then plays content of the advertisement 314 during the playback of the updated program content stream 120c at a time during playback of the updated program content stream 120c that correlates to the insertion point into the updated program content stream 120c of the identifier of the advertisement 205.

In some embodiments, the receiving device 140, the content server 110, the image detection and recognition component 164, the asset matching component 166, the ID insertion component 168, the addressable insertion engine component 172 and/or the device playout component 174 include an application program interface ("API") that provides programmatic access to one or more of their respective functions. For example, such an API may provide a programmatic interface to one or more functions of the receiving device 140, the content server 110, the image detection and recognition component 164, the asset matching component 166, the ID insertion component 168, the addressable insertion engine component 172 and/or the device playout component 174 that may be invoked by other programs, a remote control (not shown), a mobile device (not shown), a content provider, a program distributor, advertisers, or from third party advertisement aggregators or services. In this manner, the API may facilitate the development of third-party software, such as various different on-demand service applications, user interfaces, plug-ins, adapters (e.g., for integrating functions of the receiving device 140, the content server 110, the image detection and recognition component 164, the asset matching component 166, the ID insertion component 168, the addressable insertion engine component 172 and/or the device playout component 174 into desktop applications and mobile device applications), and the like to facilitate targeted advertisement insertion into a program content stream by other programs, a remote control (not shown), a mobile device (not shown), a content provider, a program distributor, advertisers, or from third party advertisement aggregators or services.

In an example embodiment, components/modules of the system 100 are implemented using standard programming techniques. For example, the image detection and recognition component 164, the asset matching component 166, the ID insertion component 168, the addressable insertion engine component 172 and/or the device playout component 174 may be implemented as a "native" executable running on one or more central processing units (CPUs), along with one or more static or dynamic libraries. In other embodiments, the image detection and recognition component 164, the asset matching component 166, the ID insertion component 168, the addressable insertion engine component 172 and/or the device playout component 174 may be implemented as instructions processed by a virtual machine that executes as one or more other programs. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device and/or the content server 110 to perform the functions of the image detection and recognition component 164, the asset matching component 166, the ID insertion component 168, the addressable insertion engine component 172 and/or the device playout component 174. In one embodiment, instructions cause a corresponding CPU or some other processor, such as an I/O controller/processor, to receive the program content stream, detect images in the content stream, recognize at least one visual object within the images, match the recognized at least one visual object within the images to an advertisement that correlates with the recognized at least one visual object, insert an identifier of the matched advertisement at an insertion point into the program content stream, and play the content of the matched advertisement during the playback of the program content stream at a time during playback of the program content stream that correlates to the insertion point into the program content stream of the identifier of the matched advertisement.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by implementation of the image detection and recognition component 164, the asset matching component 166, the ID insertion component 168, the addressable insertion engine component 172 and/or the device playout component 174. Also, other functions could be implemented and/or performed by each component/module, and in different orders, and by different components/modules, yet still achieve the functions of the image detection and recognition component 164, the asset matching component 166, the ID insertion component 168, the addressable insertion engine component 172 and/or the device playout component 174.

In addition, programming interfaces to the data stored as part of the image detection and recognition component 164, the asset matching component 166, the ID insertion component 168, the addressable insertion engine component 172 and/or the device playout component 174, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage of the program content 120 and advertisement content 130 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the image detection and recognition component 164, the asset matching component 166, the ID insertion component 168, the addressable insertion engine component 172 and/or the device playout component 174.

Furthermore, in some embodiments, some or all of the components of the image detection and recognition component 164, the asset matching component 166, the ID insertion component 168, the addressable insertion engine component 172 and/or the device playout component 174 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 4:
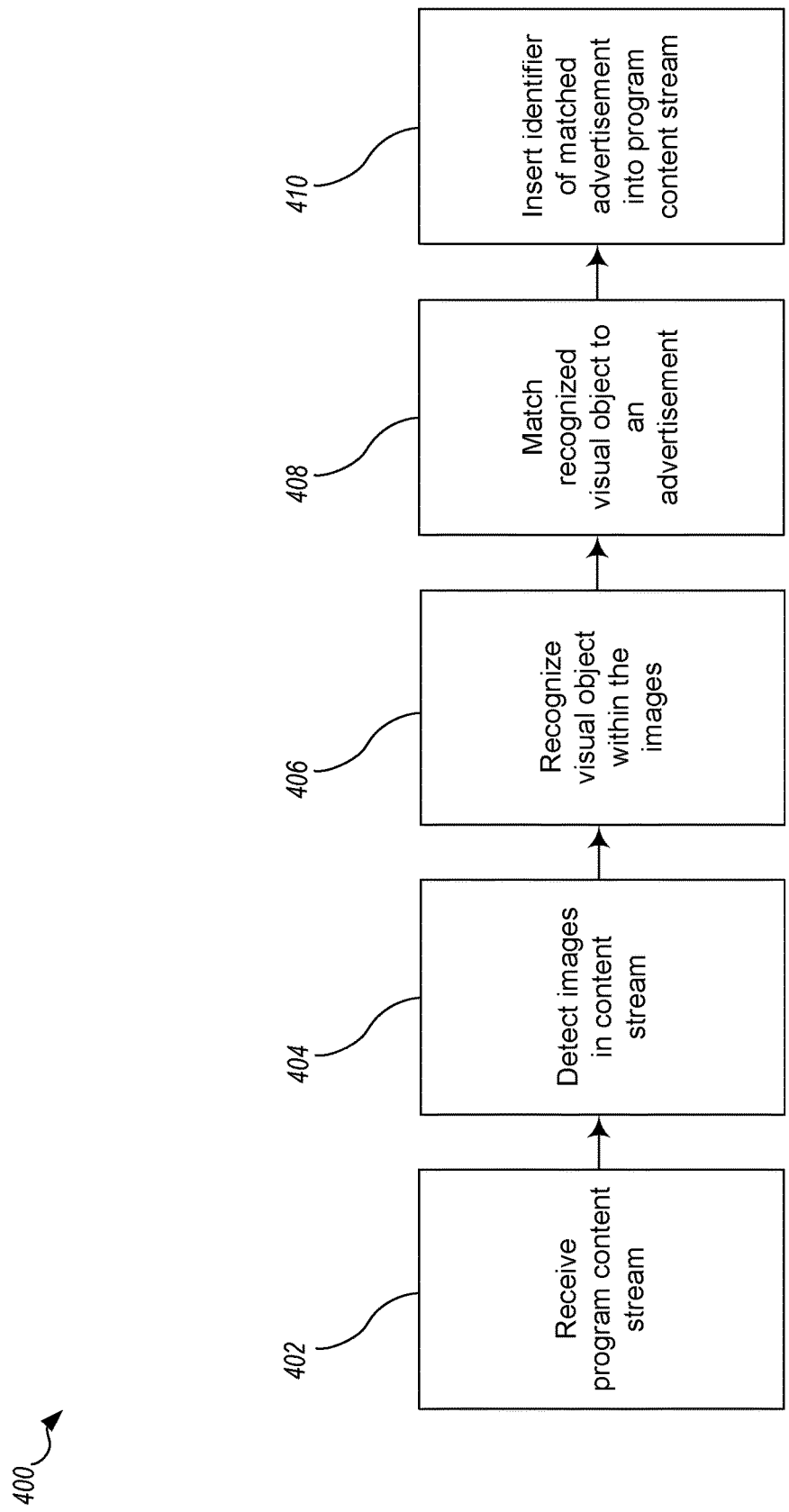
FIG. 4 is a flowchart illustrating a method for inserting an identifier of the advertisement into the program content stream during the playback of the program content stream, according to one embodiment.

FIG. 4 is a flowchart illustrating a method 400 for inserting an identifier of the advertisement into the program content stream during the playback of the program content stream, according to one embodiment. At 402, the system 100 receives the program content stream.

At 404, the system 100 detects images in the content stream.

At 406, the system 100 recognizes at least one visual object within the images.

At 408, the system 100 matches the recognized at least one visual object within the images to an advertisement that correlates with the recognized at least one visual object.

At 410, the system 100 inserts an identifier of the matched advertisement at an insertion point into the program content stream. This enables playback of the matched advertisement during playback of the program content stream at a time that correlates to the insertion point into the program content stream of the identifier of the matched advertisement.

Figure 5:
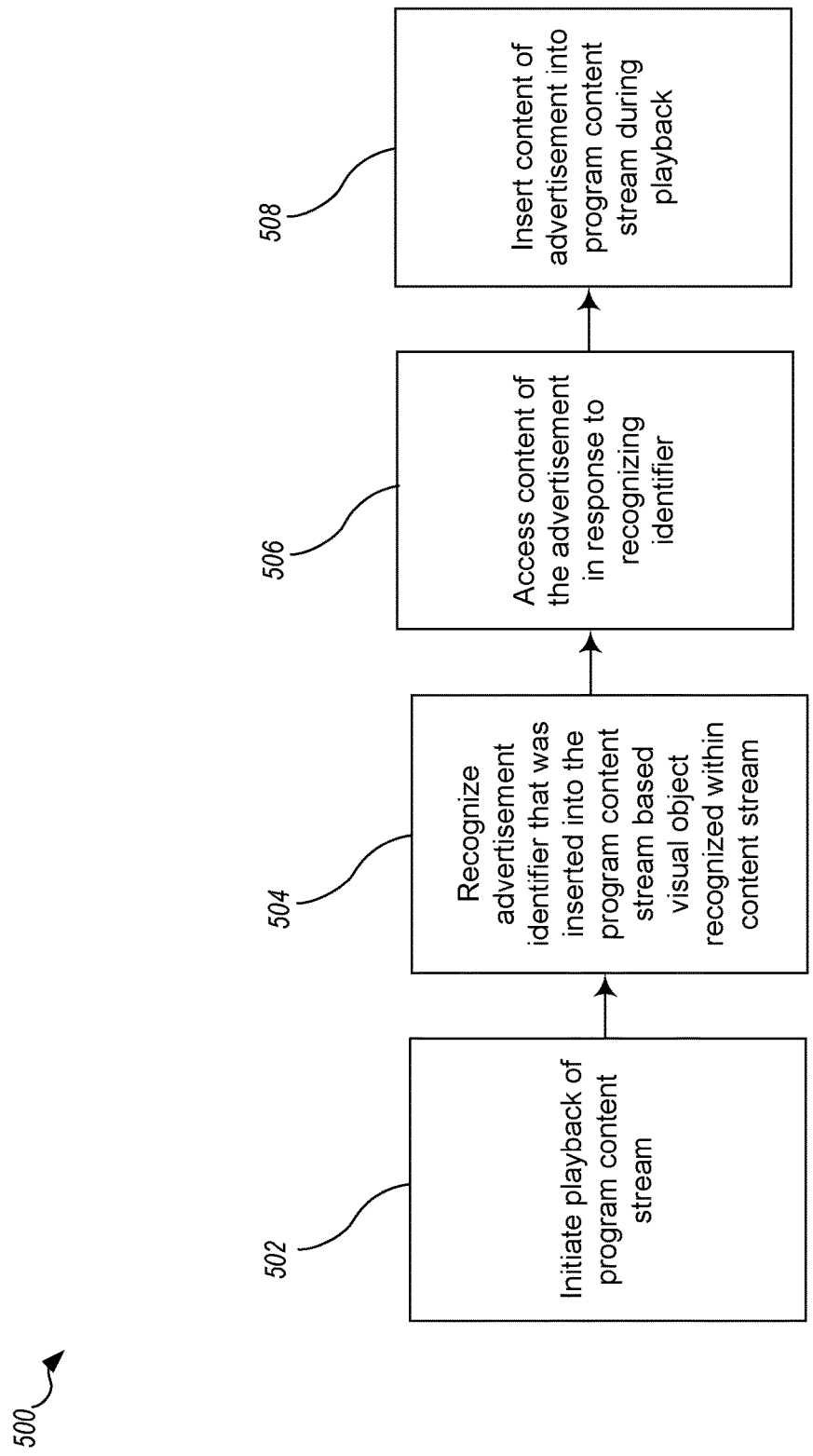
FIG. 5 is a flowchart illustrating a method for inserting the content of the advertisement into the program content stream during the playback of the program content stream, according to one embodiment.

FIG. 5 is a flowchart illustrating a method 500 for inserting the content of the advertisement into the program content stream during the playback of the program content stream, according to one embodiment.

At 502, the system 100 initiates playback of a program content stream;

At 504, the system recognizes an identifier of an advertisement during playback of the program content stream. The identifier was inserted at an insertion point into the program content stream in response to at least one visual object recognized within images of the content stream being matched to the advertisement which correlates with the recognized at least one visual object.

At 506, the system 100 accesses content of the advertisement in response to the recognizing of the identifier of the advertisement during playback of the program content stream.

At 508, the system 100 inserts the content of the advertisement into the program content stream during the playback of the program content stream. In one embodiment, the accessing content of the advertisement in response to the recognizing the identifier of the advertisement during playback of the program content stream may include accessing content of the advertisement at a set-top box from a remote advertisement server. In another embodiment, the accessing content of the advertisement in response to the recognizing the identifier of the advertisement during playback of the program content stream may include accessing content of the advertisement by a set-top box from local storage of the set-top box.

FIG. 6 is a flowchart illustrating a method 600 for matching a visual object recognized within the program content stream to an advertisement according to one embodiment.

At 602, the system 100 accesses a plurality of stored advertisement data corresponding to a plurality of different advertisements.

At 604, the system 100 determines which advertisement of the plurality of advertisements advertises a product that correlates with at least one visual object recognized within images of a program content stream based on the accessing of the plurality of stored advertisement data.

At 606, the system 100 matches the at least one visual object recognized within the images to the determined advertisement of the plurality of advertisements.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for targeted ad insertion into a program content stream, comprising:
    receiving, by a computerized system for targeted ad insertion, the program content stream;
    detecting, by the computerized system for targeted ad insertion, images in the content stream;
    recognizing at least one visual object within the images;
    matching, by the computerized system for targeted ad insertion, the recognized at least one visual object within the images to an advertisement that correlates with the recognized at least one visual object;
    in response to the matching the recognized at least one visual object within the images to an advertisement that correlates with the recognized at least one visual object, inserting, by the computerized system for targeted ad insertion, an identifier of the matched advertisement at an insertion point into the program content stream indicated by an existing advertisement insertion cue, the inserting of the identifier of the matched advertisement updating the program content stream enabling playback of the matched advertisement during playback of the program content stream at a time that correlates to the insertion point into the program content stream of the identifier of the matched advertisement;
    initiating, by the computerized system for targeted ad insertion, playback of the program content stream;
    recognizing in the program content stream, by the computerized system for targeted ad insertion, during playback of the program content stream, the identifier of the matched advertisement that was previously inserted at the insertion point into the program content stream;
    accessing, by the computerized system for targeted ad insertion, content of the matched advertisement by using the identifier of the matched advertisement that was previously inserted at the insertion point into the program content stream in response to the recognizing, during playback of the program content stream, the identifier of the matched advertisement that was previously inserted at the insertion point into the program content stream; and
    inserting, by the computerized system for targeted ad insertion, the content of the matched advertisement into the program content stream during the playback of the program content stream based on the identifier of the matched advertisement that was previously inserted at the insertion point into the program content stream.

2. The method of claim 1, further comprising:
    playing, by the computerized system for targeted ad insertion, the content of the matched advertisement during the playback of the program content stream at a time during playback of the program content stream that correlates to the insertion point into the program content stream of the identifier of the matched advertisement.

3. The method of claim 2, wherein the initiating playback of the program content stream; recognizing the identifier of the matched advertisement during playback of the program content stream; the accessing content of the matched advertisement in response to the recognizing the identifier of the matched advertisement during playback of the program content stream; and the inserting the content of the matched advertisement into the program content stream during the playback of the program content stream are performed by a receiving device at a customer premises.

4. The method of claim 2, wherein the playing the content of the matched advertisement during the playback of the program content stream at a time during playback of the program content stream that correlates to the insertion point into the program content stream of the identifier of the matched advertisement is performed by a receiving device at a customer premises.

5. The method of claim 1, wherein the receiving the program content stream; the detecting images in the content stream; the recognizing at least one visual object within the images; the matching the recognized at least one visual object within the images to an advertisement that correlates with the recognized at least one visual object; and the inserting, the identifier of the matched advertisement at an insertion point into the program content stream, enabling playback of the matched advertisement during playback of the program content stream at a time that correlates to the insertion point into the program content stream of the identifier of the matched advertisement are performed by a content server outside a customer premises.

6. The method of claim 1, wherein the recognizing the at least one visual object within the images includes:
    detecting a plurality of visual object candidates within the images;
    determining at least one of the visual object candidates is a type of visual object associated with one or more of a plurality of advertisements; and
    recognizing the at least one of the visual object candidates as the at least one visual object within the images based on the determination.

7. The method of claim 1, wherein the matching the recognized at least one visual object within the images to an advertisement that correlates with the recognized at least one visual object includes:
    accessing a plurality of stored advertisement data corresponding to a plurality of different advertisements;
    determining which advertisement of the plurality of advertisements advertises a product or service that correlates with the recognized at least one visual object within the images based on the accessing of the plurality of stored advertisement data; and
    matching the recognized at least one visual object within the images to the determined advertisement of the plurality of advertisements.

8. The method of claim 1, further comprising:
    detecting, by the computerized system for targeted ad insertion, audio in the content stream;
    recognizing, by the computerized system for targeted ad insertion, at least one characteristic of the audio;
    matching, by the computerized system for targeted ad insertion, the recognized at least one characteristic of the audio to an advertisement that correlates with the recognized at least one characteristic of the audio; and
    inserting, by the computerized system for targeted ad insertion, an identifier of the matched advertisement at an insertion point into the program content stream, enabling playback of the matched advertisement during playback of the program content stream at a time that correlates to the insertion point into the program content stream of the identifier of the matched advertisement.

9. A system, comprising:
at least one computer processor; and
at least one memory coupled to the at least one computer processor, the at least one memory having computer-executable instructions stored thereon that, when executed by the at least one computer processor, cause the at least one computer processor to:
  initiate playback of a program content stream;
  recognize in the program content stream, an identifier of a matched advertisement during playback of the program content stream, the identifier of the matched advertisement having been inserted at an insertion point into the program content stream in response to at least one visual object recognized within images of the content stream being matched to the advertisement which correlates with the recognized at least one visual object;
  access content of the matched advertisement by using the identifier of the matched advertisement that was previously inserted at the insertion point into the program content stream in response to the recognizing, during playback of the program content stream, the identifier of the matched advertisement that was previously inserted at the insertion point into the program content stream; and
  insert the content of the matched advertisement into the program content stream during the playback of the program content stream based on the identifier of the matched advertisement that was previously inserted at the insertion point into the program content stream.

10. The system of claim 9, wherein the computer-executable instructions, when executed by the at least one computer processor, further cause the at least one computer processor to:
  play the content of the advertisement during the playback of the program content stream at a time during playback of the program content stream that correlates to the insertion point into the program content stream of the identifier of the advertisement.

11. The system of claim 10, wherein the accessing content of the matched advertisement includes accessing content of the matched advertisement at a set-top box from a remote advertisement server.

12. The system of claim 10, wherein the accessing content of the matched advertisement includes accessing content of the matched advertisement by a set-top box from local storage of the set-top box.

13. The system of claim 9, wherein the computer-executable instructions, when executed by the at least one computer processor, further cause the at least one computer processor to:
  receive a plurality of stored advertisement data corresponding to a plurality of different advertisements;
  search the plurality of stored advertisement data corresponding to a plurality of different advertisements for advertisement data that is identified by the identifier of the matched advertisement during playback of the program content stream; and
  access content of the matched advertisement in response to the recognizing the identifier of the advertisement during playback of the program content stream based on the advertisement data that is identified by the identifier of the matched advertisement during playback of the program content stream.

14. A non-transitory computer-readable storage medium having computer-executable instructions stored thereon that, when executed by at least one processor, cause the at least one processor to:
  access a plurality of stored advertisement data corresponding to a plurality of different advertisements;
  determine which advertisement of the plurality of advertisements advertises a product or service that correlates with at least one visual object recognized within images of a program content stream based on the accessing of the plurality of stored advertisement data;
  match the at least one visual object recognized within the images to the determined advertisement of the plurality of advertisements;
  insert an identifier of the determined advertisement of the plurality of advertisements at an insertion point into the program content stream, enabling playback of the determined advertisement of the plurality of advertisements during playback of the program content stream at a time that correlates to the insertion point into the program content stream of the identifier of the determined advertisement of the plurality of advertisements;
  initiate playback of the program content stream;
  recognize in the program content stream during playback of the program content stream, the identifier of the determined advertisement that was previously inserted at the insertion point into the program content stream;
  access content of the determined advertisement by using the identifier of the determined advertisement that was previously inserted at the insertion point into the program content stream in response to the recognizing, during playback of the program content stream, the identifier of the determined advertisement that was previously inserted at the insertion point into the program content stream; and
  insert, by a computerized system for targeted ad insertion, the content of the determined advertisement into the program content stream during the playback of the program content stream based on the identifier of the determined advertisement that was previously inserted at the insertion point into the program content stream.

* * * * *